Patented Jan. 12, 1943

2,307,885

UNITED STATES PATENT OFFICE 2,307,885

LUBRICATING PRODUCT

Anthony H. Gleason, Westfield, N. J., assignor to Standard Oil Development Company, a corporation of Delaware No Drawing. Application July 16, 1940, Serial No. 345,857

7 Claims. (Cl. 252—57)

This invention relates to improvements in lubricating qualities of hydrocarbon oils, particularly to improvements in viscosity characteristics by blending hydrocarbon lubricating oils with oil-soluble resinous products.

In accordance with the present invention, it has been found that vinyl phenol polymers and analogous substituted vinyl phenyl polymers may be modified by esterification to prepare oil-soluble products which are suitably soluble in viscous hydrocarbon oils and which, when blended with such oils, impart desirable improved qualities. For example, these oil-soluble resins when added in even very minor concentrations materially improve the viscosity characteristics of the oil. Furthermore, such modified resin products possess desirable characteristics of oiliness carriers and pour point depressors.

Synthetic oil-soluble resins useful in forming lubricating oil addition agents in accordance with this invention may be produced by condensing phenolic compounds with unsaturated aliphatic compounds such as unsaturated alcohols, esters, ethers, ketones, aldehydes, or hydrocarbons, using an acidic catalyst, and conducting the condensation at controlled sufficiently low temperatures in order to have the reaction take place uniformly and smoothly. The condensation is carried out preferably in the presence of a diluent which is inert under the conditions of polymerization. The polymerization product obtained by this procedure is, in general, somewhat soluble in oxygen-containing aliphatic solvents, such as ether and acetone, but is practically insoluble in lubricating hydrocarbon oils.

With suitable precautions taken in maintaining the proper conditions of polymerization, the polymers formed by the reaction of the unsaturated aliphatic compounds and the phenolic compounds tend to be of the two-dimensional type constituted of substituted phenol groups linked together in a chain by alkylene groups, thus being constituted of recurring structural units represented by:

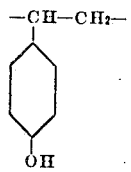

In preparing the preferred types of polymers which may be described as vinyl phenol polymers, one of the initial reactants is a phenolic type compound, which includes simple phenol or substituted phenols, such as alkyl phenols; and the other reactant is an unsaturated aliphatic compound containing a functional oxygen- or halogen-containing group. As previously mentioned, a condensation reaction of these two types of reactants proceeds generally quite vigorously with the intervention of an acidic catalyst even in the presence of an inert diluent or solvent.

The exact metchanism of the polymerization reaction is not entirely understood, but it appears that a reactive group of the unsaturated aliphatic reactant becomes substituted in the phenol mainly in the ortho or para position or becomes condensed with the phenol and by rearrangement becomes substituted in the para position. In any event, the polymerization reaction takes place rapidly with evolution of heat, and the final product assumes the character of a linear or two dimensional polymer containing the phenolic hydroxy groups.

These linear phenolic polymers are capable of being modified with replacement of hydrogen in the hydroxy groups by alkyl or acyl radicals, thereby forming ethers or esters; and by selecting suitable reactants, preferably for an esterifying reaction, the polymer is considerably modified to be rendered oil-soluble. It is estimated that the polymer has a molecular weight above 1,000 and on the average ranges from about 3,000 to 20,000 or higher. The esterified polymer accordingly has a still higher molecular weight of the order of about 5,000 to 40,000.

The present invention does not preclude the preparation of the oil-soluble resins by methods in which the monomer to be polymerized is first obtained by formation of the polymerizable substituted phenol, e. g., the ortho vinyl phenol, nor does it preclude the formation of the oil-soluble polymers by using as the initial monomer to be polymerized a suitable ester of the vinyl phenol, for various other methods may be used to obtain the oil-soluble linear type polyesters constituted of aryl groups containing the aliphatic ester functions as nuclear substituents and interlinked by a chain of alkylene groups.

Specific examples of the unsaturated aliphatic reactant useful for producing the monomer are the following: ethylene oxide, vinyl chloride, vinyl acetate, vinyl ether, allyl ether, ethyl allyl ether, and the like.

The diluent or solvent employed may be one or a mixture of two or more of the following: benzene, ethylene chloride, benzyl alcohol, chloroform, and ethyl acetate.

Suitable condensing agents are such as Friedel-Crafts type catalysts, including aluminum chloride, zinc chloride and boron fluoride. However, sulfuric acid and phosphoric acid may also be used.

The term "vinyl phenol" is intended to include not only the aromatic compounds which have the formula $CH_2{:}CH{-}C_6H_4OH$ but various other compounds constituted of an aryl or alkaryl group having a hydroxyl radical substituent and an unsaturated aliphatic substituent, the unsaturated aliphatic substituent containing the vinyl group $CH_2:CH-$.

The following examples are presented to indicate how the desired oil-soluble vinyl phenol polymer esters are prepared and to demonstrate the advantages of these products as hydrocarbon oil blending agents, but these examples are not to be considered as limiting this invention in any way.

*Example*

Phenol was mixed with vinyl acetate in a flask, the phenol being slightly in excess of a mol to mol proportion to the vinyl acetate. While cooling the mixture, 0.1 mol of concentrated sulfuric acid was added slowly with rapid agitation, and the reaction mixture was allowed to stand for a few days. The mixture was kept below 0° C. to prevent violent reaction, which tended otherwise to occur. When the reaction was ended, the resinous product formed was washed several times with hot water to remove excess phenol, acetic acid, and sulfuric acid present. The recovered resin had a deep red color and was very viscous when heated, but solidified and fractured on cooling.

A portion of the resinous material was dissolved in dry pyridine and reacted in this solution with oleic acid chloride in sufficient amount to esterify the hydroxyl groups of the resin. The esterified resin was found satisfactorily soluble in viscous hydrocarbon oil products such as lubricating oils.

Blends were made up of the thus formed oil-soluble esterified resin with samples of a reference hydrocarbon lubricating oil to determine the effect of the addition agent on the viscosity characteristics of the hydrocarbon oil. A comparison of the viscosity characteristics of the blended and unblended oils is as follows:

|  | Saybolt vis/100° F. | Saybolt vis/210° F. | Viscosity index |
|---|---|---|---|
| Blank (S. A. E. 20W hydrocarbon oil) | 275.8 | 45.9 | 16 |
| Blend (blank oil+2% of the polyester) | 445 | 55.8 | 65 |

The process of the foregoing example may be carried out with variations in the vinyl reactant, the phenol reactant, and in the esterifying agent, as already mentioned, with proper care taken to have the vinyl and phenol or hydroxy aromatic compounds form high molecular weight polymers. Instead of phenols, benzoic acid or its esters may be employed.

It has been found that with too rapid reaction, which may occur if the temperature is not controlled, the polymerization tends to form tarry products and three dimensional polymers of no oil blending value.

The esterifying agent is preferably a fatty acid, the acid anhydride, or fatty acid chloride containing about 8 or more carbon atoms per molecule, and these compounds may be obtained from materials such as coconut oil, lard oil, cottonseed oil, fish oil, and various other vegetable or animal oils, or oxidized oils formed synthetically from hydrocarbons, these materials being the source of acids, such as lauric, myristic, palmitic, stearic, oleic, linoleic, linolenic and oxidized wax acids.

If the phenolic compounds are of the alkylated type, the esterifying reagent may be of lower molecular weight, and in the event the polymeric compound contains acid substituents, corresponding alcohols may be used as esterifying agents.

Various means may be used for promoting the reaction if the reactants are less active, as for example ultraviolet light, more elevated temperatures and catalytic promoting agents, such as peroxides, e. g., benzoyl peroxide.

The oil-soluble esters of the vinyl aryl resins may be used as improving agents in various types of hydrocarbon products such as spindle oils, Diesel fuels, lubricating oils, slushing oils, greases, asphalts, and similar compositions. They may be used alone or in combination with other desired addition agents. They are preferably used for improving the viscosity index of lubricating oils and for thickening relatively non-viscous oils higher boiling than gasoline, and for these purposes they are suitable in small proportions of from about 0.2% to 5% by weight of the composition.

This invention is not to be limited to any of the examples or theories which have been presented in explanation of the described processes, since there are various modifications which come within the scope of the invention as defined in the following claims.

I claim:

1. A lubricating hydrocarbon product comprising a lubricating hydrocarbon oil blended with from 0.2% to 5% of a vinyl phenol polymer in which the hydroxyl groups are esterified to render the polymer soluble in the hydrocarbon oil.

2. A composition of matter comprising a petroleum lubricating oil containing in solution from about 0.2% to 5% of a modified resin composed of aliphatic esters of a polyvinylphenol in which phenolic hydroxy groups are esterified.

3. A composition of matter comprising a petroleum lubricating oil blended with from about 0.2% to 5% of a modified resin composed of polyvinylphenol in which phenolic hydroxy groups are esterified by oleic acid chloride.

4. A composition of matter comprising a petroleum lubricating oil blended with a viscosity index improving amount of at least about 0.2% of a linear vinyl benzoic acid polymer rendered soluble in said oil by esterification of carboxyl functions in said polymer by an aliphatic compound.

5. A lubricant comprising a petroleum lubricating oil containing in solution from about 0.2% to 5% of a vinyl phenol polymer having a molecular weight of at least about 1000 and in which the phenolic hydroxy groups are esterified by a fatty acid having at least 8 carbon atoms per molecule.

6. A lubricating product of improved viscosity characteristics comprising a hydrocarbon lubricating oil blended with about 0.2% to about 5% of a substituted linear vinyl aryl polymer rendered soluble in said oil by oxygen-containing side chain aliphatic substituent groups directly attached to recurring aryl nuclei in said polymer, the aryl nuclei containing said side chain substituent groups being interconnected by hydrocarbon groups which are linked to nuclear carbon atoms other than those linked to said side chain substituents in the aryl nuclei.

7. A product as described in claim 6, in which said side chain aliphatic substituent groups are alkyl ester radicals.

ANTHONY H. GLEASON.